United States Patent
Diroo et al.

(10) Patent No.: US 7,336,968 B2
(45) Date of Patent: Feb. 26, 2008

(54) IPT X11 MEDIATION LAYER AND PROCESS

(75) Inventors: Yolius Diroo, San Antonio, TX (US); Edward Walter, Boerne, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 201 days.

(21) Appl. No.: 11/125,502

(22) Filed: May 10, 2005

(65) Prior Publication Data

US 2006/0256780 A1    Nov. 16, 2006

(51) Int. Cl.
   *H04J 3/16*    (2006.01)
(52) U.S. Cl. .................. 455/469; 370/356; 370/329; 370/338; 370/401; 455/67.11; 455/67.14; 455/452.2
(58) Field of Classification Search .............. 370/469, 370/401, 356, 329, 338, 352, 389, 400, 465; 455/67.11, 67.14, 452.2
See application file for complete search history.

(56) References Cited

U.S. PATENT DOCUMENTS

| | | | |
|---|---|---|---|
| 6,678,357 B2 | 1/2004 | Stumer et al. | |
| 7,043,252 B2* | 5/2006 | Khitrik et al. | ........... 455/452.2 |
| 2004/0057425 A1 | 3/2004 | Brouwer et al. | |
| 2004/0249953 A1* | 12/2004 | Fernandez et al. | .......... 709/227 |
| 2005/0036470 A1* | 2/2005 | Calvert | ........................ 370/338 |
| 2006/0233134 A1* | 10/2006 | Croner et al. | ............ 455/452.2 |

OTHER PUBLICATIONS

Nuvio Launches E911 Services Nationwide-Adding Advanced Functionality To Its Comprehensive NuvioCentrex Offering, http://eetimes.com, (Feb. 24, 2005), [retrieved Apr. 19, 2005], 3 pages.

* cited by examiner

*Primary Examiner*—Sanh D. Phu
(74) *Attorney, Agent, or Firm*—Jackson Walker L.L.P.

(57) ABSTRACT

The present invention discusses a method and apparatus for providing customer information, such as a physical address etc., to a call destination, such as a Public Safety Answering Point (PSAP), over an Internet Protocol (IP) communication link. A mediation layer maintains a table tracking information such as IP address, physical location of the customer, and MAC (Media Access Control) Address. When a call is placed, an IP address is sent to the mediation layer. The mediation layer selects appropriate caller information and routes the information to the network, which routes the information to the PSAP. The mediation layer maintains customer information through a Virtual Central Repository (VCR), and IP addresses through a Dynamic Host Configuration Protocol (DHCP) Server on an ongoing basis. The mediation layer can comprise multiple interconnected mediation layers in cooperation.

15 Claims, 6 Drawing Sheets

IPT X11 MEDIATION LAYER AND PROCESS

BACKGROUND OF THE INVENTION

1. Field of the Invention

The present invention relates to emergency communication links in a telephone network. In particular, the present invention relates to providing emergency services over a total IP (Internet Protocol) Telephone Network.

2. Description of the Related Art

Emergency calls, such as 911 calls, are currently placed over a telephone connection and routed to a Public Safety Answering Point (PSAP), where they are answered by attending personnel, such as a dispatcher. Emergency 911 calls are one of several X11-type calls (i.e. 911, 311, 511, etc.) that are handled at a PSAP. Usually, a TDM (Time Division Multiplex) connection to the telephone company's network connects the call to the PSAP. Time Division Multiplexing is a form of digital multiplexing in which two or more apparently simultaneous channels are derived from a given frequency spectrum (i.e., a bit stream) by interleaving pulses (representing bits) from different channels. In a TDM, a given channel is shared in time by two or more signals. The different signals alternate or take their turn in the channel.

IP Telephony, also called 'Internet telephony', is a technology that enables routing of voice conversations over the Internet or over a dedicated Internet Protocol (IP) network, instead of over dedicated voice transmission lines. Use of IP Telephony eliminates the use of circuit switching and the associated waste of bandwidth. Instead, packet switching is used, in which IP packets with voice data are sent over the network only when data needs to be sent, i.e., when a caller is talking. The protocols used to carry the signal over the IP network are commonly referred to as Voice over IP or VoIP protocols.

As VoIP technology gains in market acceptance, there is a need by the customers to utilize this technology for all types of services, including emergency services. In general, emergency services are not provided over a total VoIP network. Thus, when an IP telephone user dials 911, the call is directed to a vacant code (e.g., never finds a termination point, such as a PSAP). Those VoIP providers that do provide 911 service, such as the HIPCS (Hosted IP Communication Service) of SBC (Southwestern Bell Corporation), typically convert the VoIP call to TDM and redirect the call to the appropriate PSAP or call center over the TDM network. As VoIP service continues to expand, there is a need for providing a total VoIP network connection enabling X11 calls from a customer to a local PSAP or call center. The present invention addresses this need.

SUMMARY OF THE INVENTION

The present invention discloses a method and apparatus for providing customer information to a call destination over an Internet Protocol (IP) communication link. An IP communication link can be, for example, an IP Telephone network. A call destination can be, for example, a Public Safety Answering Point (PSAP) commonly used to handle X11 calls, such as emergency 911 calls. When a customer calls a X11 number, certain customer information is provided to the PSAP. Customer information generally refers to the address of a physical location, caller name, phone number, etc. The IP communication link comprises a mediation layer for routing the customer information to the PSAP. A data table located at the mediation layer stores information such as IP address, physical location of the customer, and MAC (Media Access Control) Address identifying the device used to place an X11 call. When a call is placed, the IP address for the call is sent to the mediation layer. The mediation layer selects the related customer information. The customer information is then routed to the call destination over the IP communication link. In one embodiment of the present invention, the mediation layer further comprises multiple mediation layers that are interconnected for sharing of customer information.

Customer information can be obtained, for example, from a Virtual Central Repository (VCR), and IP addresses can be obtained from a Dynamic Host Configuration Protocol (DHCP) Server. Maintaining the entries (IP address, physical location, and MAC) to the data table at the mediation layer comprises updating IP addresses, typically using an Address Resolution Protocol request.

BRIEF DESCRIPTION OF THE DRAWINGS

For a detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

Figure 1:
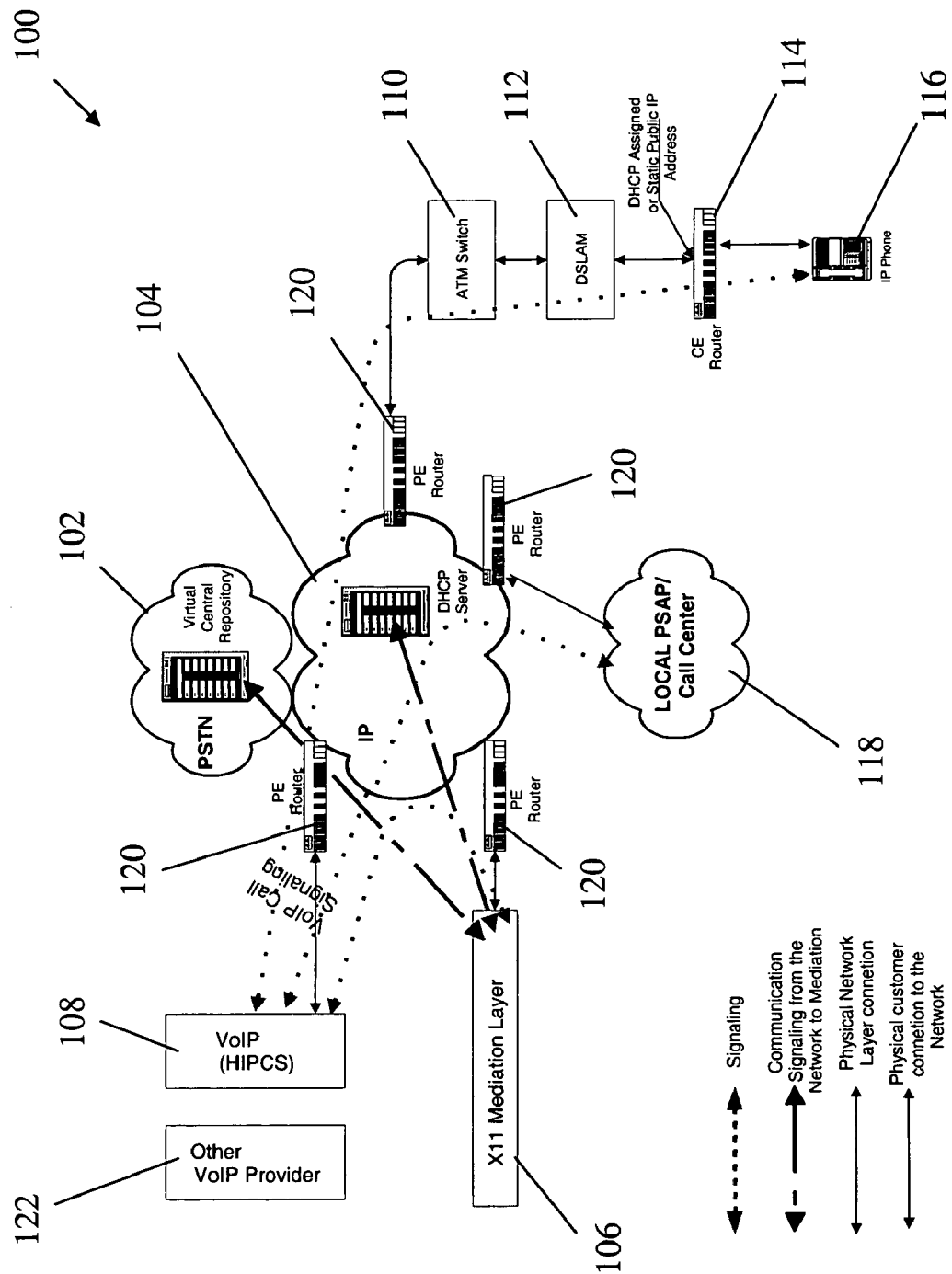
FIG. 1 illustrates an IP Telephone architecture in one aspect of the present invention.

FIG. 1 illustrates a VoIP 911 architecture 100 in one aspect of the present invention for providing end-to-end IP Telephony services, such as linking a customer to a call center. A Virtual Central Repository (VCR) 102 can be provided over a Public Switched Telephone Network (PSTN). The VCR comprises customer information such as name, telephone number and address, etc. The VCR can connect to other systems besides the present invention, such as billing systems. A Dynamic Host Configuration Protocol (DHCP) Server 104 provides the IP address of a customer using IP Telephony. DHCP is an Internet protocol for automating the configuration of computers for Internet connections. DHCP can be used to automatically assign IP addresses, etc. An X11 Mediation Layer 106 serves as an interconnection layer between the DHCP Server 102 and the VCR 104. The X11 Mediation Layer maps the phone number stored at the VCR to the IP Address stored at the DHCP server and to a MAC (Media Access Control) address received from a CPE (Customer Premises Equipment), such as a computer or IP Phone. The MAC address is a unique physical address, generally attributed to the CPE. Obtaining the permanent MAC address enables improved tracking of customers using DHCP, since a DHCP addresses are renewable and thus can change periodically.

A call made from an IP Phone 116 is sent through a CE Router (Customer Edge Router) 114 to a PE Router (Provider Edge Router) 120 by way of a DSLAM (Digital Subscriber Line Access Multiplexer) 112 and an ATM (Asynchronous Transfer Mode) Switch 110. A CE Router is a router residing at a customer site. PE Router is a router servicing the edge of a carrier's network. The PE router interacts with CE routers and with other routers within the backbone of the network. The PE router can be a routing peer of the CE router (in some routing protocol), and as a result may learn the routes leading to the CE's site. These routes can then be distributed to other PE routers. The DSLAM is a mechanism at a phone company's central location that links many customer DSL (Digital Subscriber Line) connections to a single high-speed ATM line. While voice calls are sent to the PSTN, data are sent to the DSLAM, where it passes through the ATM Switch to the Internet. The ATM switch is responsible for ATM cell transit through an ATM network. The ATM switch reads and updates header information of incoming ATM cells and quickly switches the cell to another ATM Switch or to an ATM endpoint. For ATM cells originating at the IP Phone, the DSLAM routes the packets to the ATM Switch 110 and onwards to the PE Router (Provider Edge Router) 120. In the illustration of the present invention, separate PE Routers 120 provide communication links to various services, such as SBC VoIP 108, or Vontage 122, as well as links to PSAP 118 and X11 Mediation Layer 120.

Figure 2:
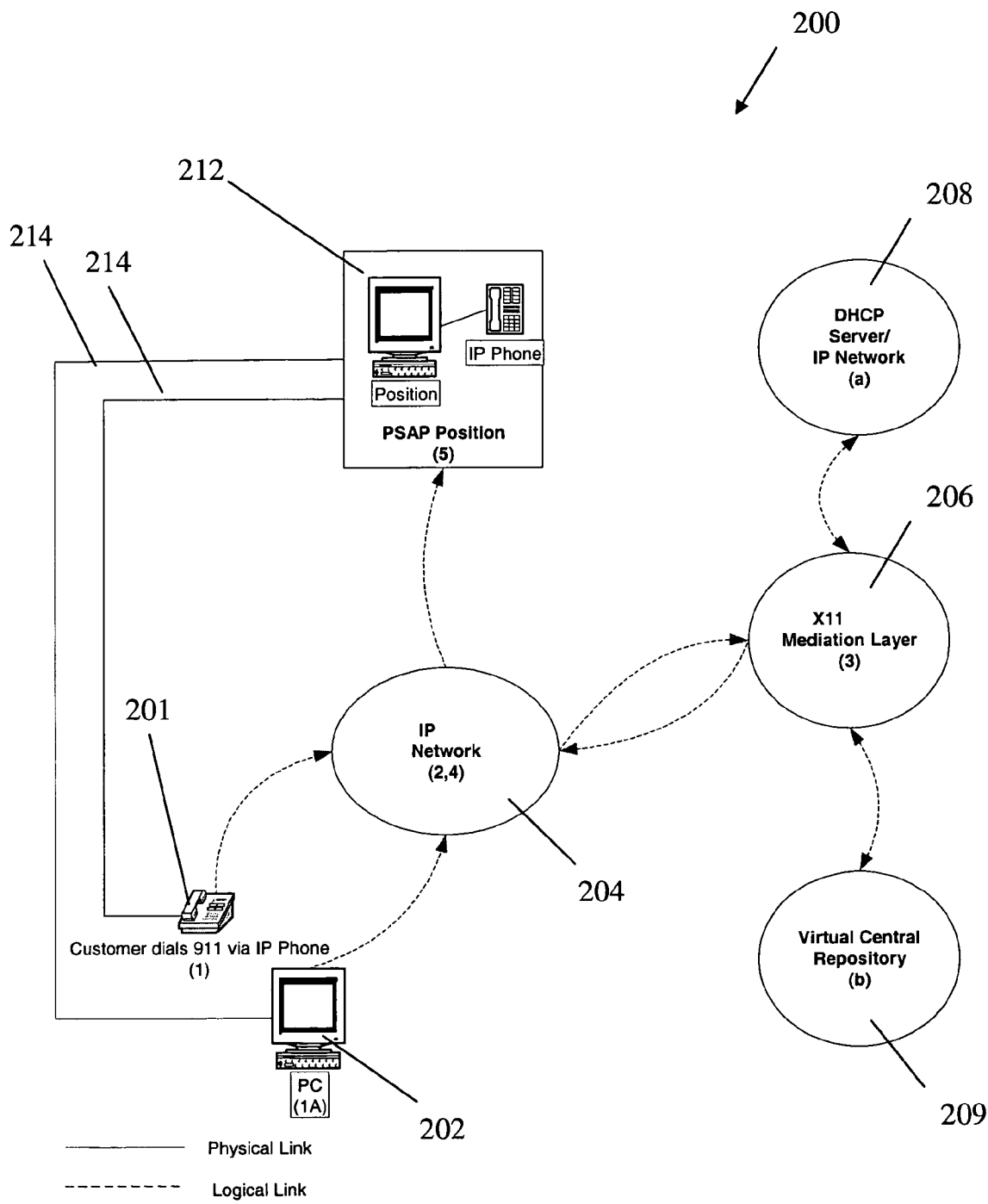
FIG. 2 illustrates a diagram of a logical connection used in one aspect of the present invention to complete a physical connection to a PSAP.
Figure 3:
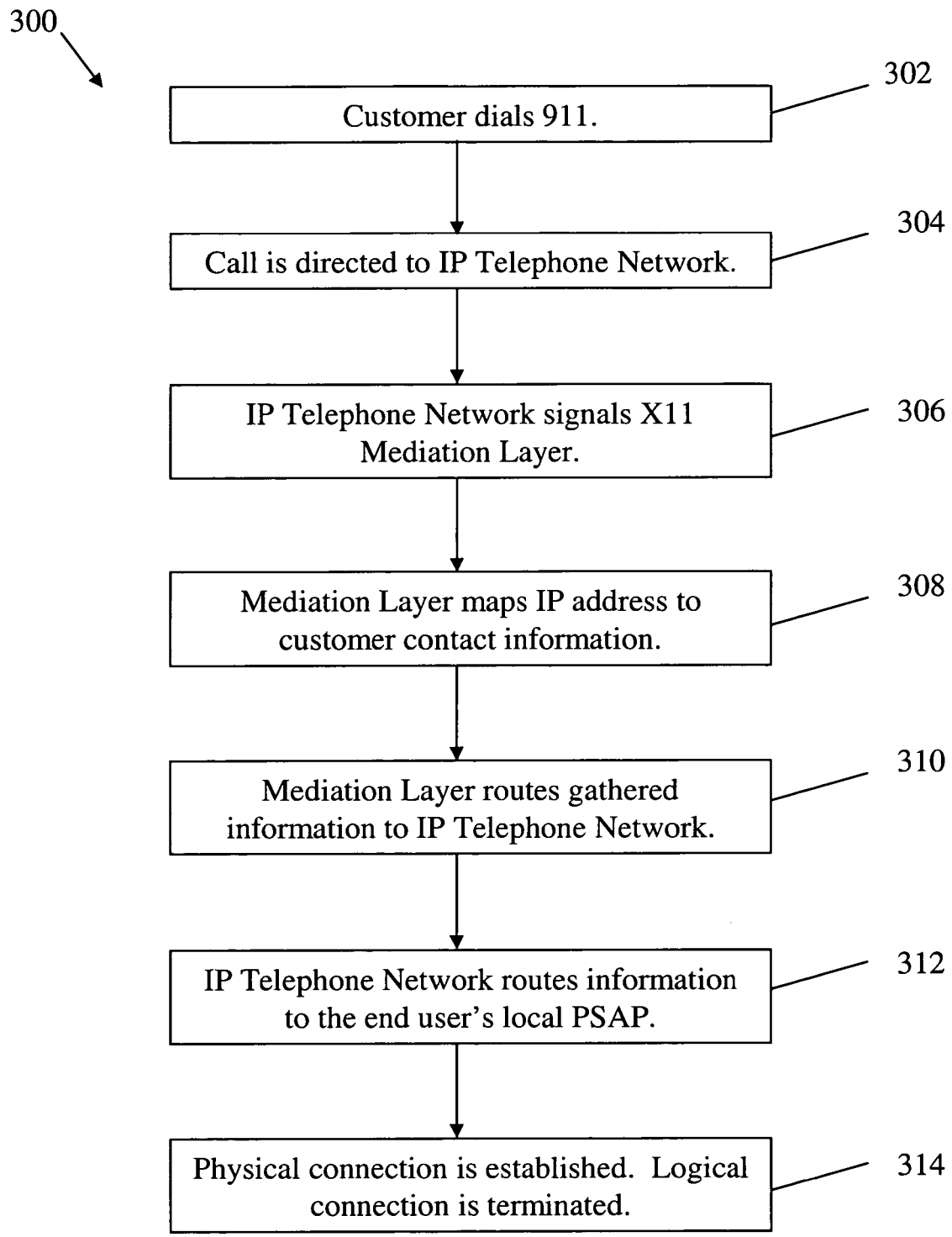
FIG. 3 illustrates a flowchart of a logical connection established in the communication link.

FIG. 2 illustrates a diagram 200 of a logical connection used in one aspect of the present invention to complete a physical connection to a PSAP. FIG. 2 can be understood through reference to flowchart 300 of FIG. 3. At Box 302 of FIG. 3, the flow is initiated when a customer utilizes an IP Phone 201 to call 911. Alternately, a customer could utilize PC 202 to send a 911 signal. The 911 call is directed to an IP Telephone Network 204, such as HIPCS Network of Southwestern Bell Corporation in Box 304. At Box 306, the IP Telephone Network recognizes the call as an emergency and signals the X11 Mediation Layer 206 with the IP address. The X11 Mediation Layer maps the IP address to customer information (Box 308) and then signals the IP Telephone Network 204 with the customer information (Box 310). Once the IP Telephone Network receives the information from the X11 Mediation Layer, it routes (Box 312) this information to the end user's local PSAP 212. At Box 314, a physical communication connection 214 is established between the end user and the PSAP. Once the physical connection has been established, the logical connection that is responsible for the routing information is terminated. At this point, the customer information typically appears on a monitor screen of the 911 personnel. The end user then holds a conversation with the 911 personnel.

Figure 4:
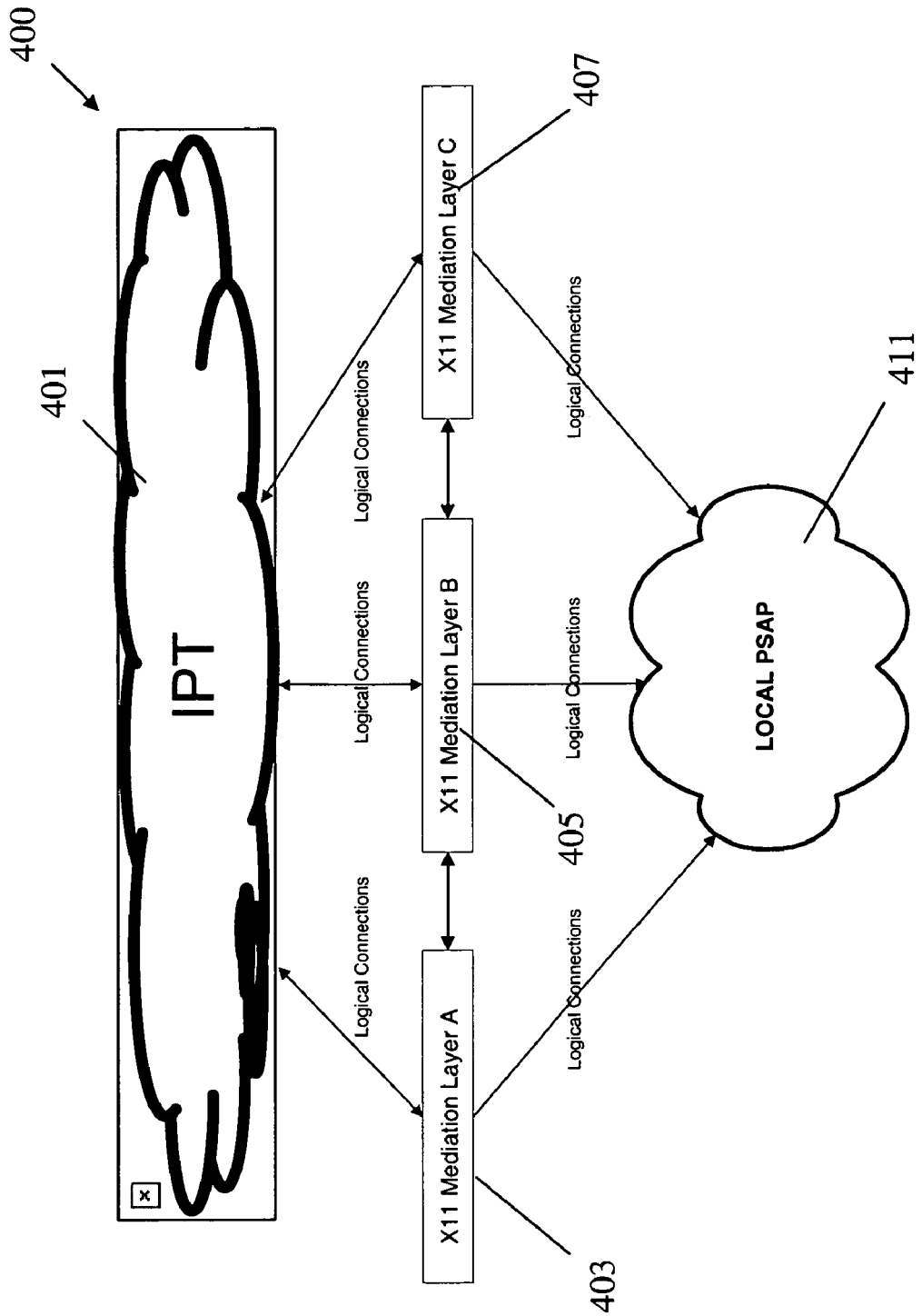
FIG. 4 illustrates network architecture comprising multiple interconnected mediation layers.

FIG. 4 illustrates network architecture 300 comprising multiple interconnected mediation layers used in cooperation for completing a X11 call to a PSAP. IPT Layer (Internet Protocol Telephony Layer) 401 comprises the set of customers utilizing IP Telephony. For purposes of illustration, three mediation layers are shown: X11 Mediation Layer A 403, X11 Mediation Layer B 405, and X11 Mediation Layer C 307. Each mediation layer can be operated by separate phone service companies, such as Regional Bell Operating Companies (RBOC), Competitive Local Exchange Carriers (CLEC), Incumbent Local Exchange Servers (ILEC), etc. Each Mediation Layer tracks information related to customers of the related companies. At the same time, each company can utilize any VoIP provider to provide VoIP X11 services, so long as they are interconnected with the X11 Mediation Layer. The X11 Mediation Layer interconnection enables customers in all territories (InterLATA, IntraLATA) to utilize the service of the present invention. Therefore a customer in a territory served by the company operating Mediation Layer A, for example, can utilize services to make X11 calls of Mediation Layer B.

As an example, a customer might have service with the company operating Mediation Layer B and make an X11 phone call using VoIP services of Company A, within the Local Access and Transport Area (LATA) of Company A. Such an X11 call connects from the IPT layer 301 to X11 Mediation Layer B 305. Mediation Layer B 305 obtains the necessary information from the Mediation Layer A 303 and then completes the call to the appropriate local PSAP 311.

In addition to mapping the customer information associated with a physical telephone number to IP address and MAC address, the Mediation Layer maintains table entries to enable correct mapping of information. The X11 Mediation Layer is in constant handshake with the DHCP Server 208, thereby enabling constant tracking of the customer IP address. The X11 Mediation Layer periodically communicates with the Virtual Central Repository 209, thereby enabling continual updating of the customer contact information.

Figure 5:
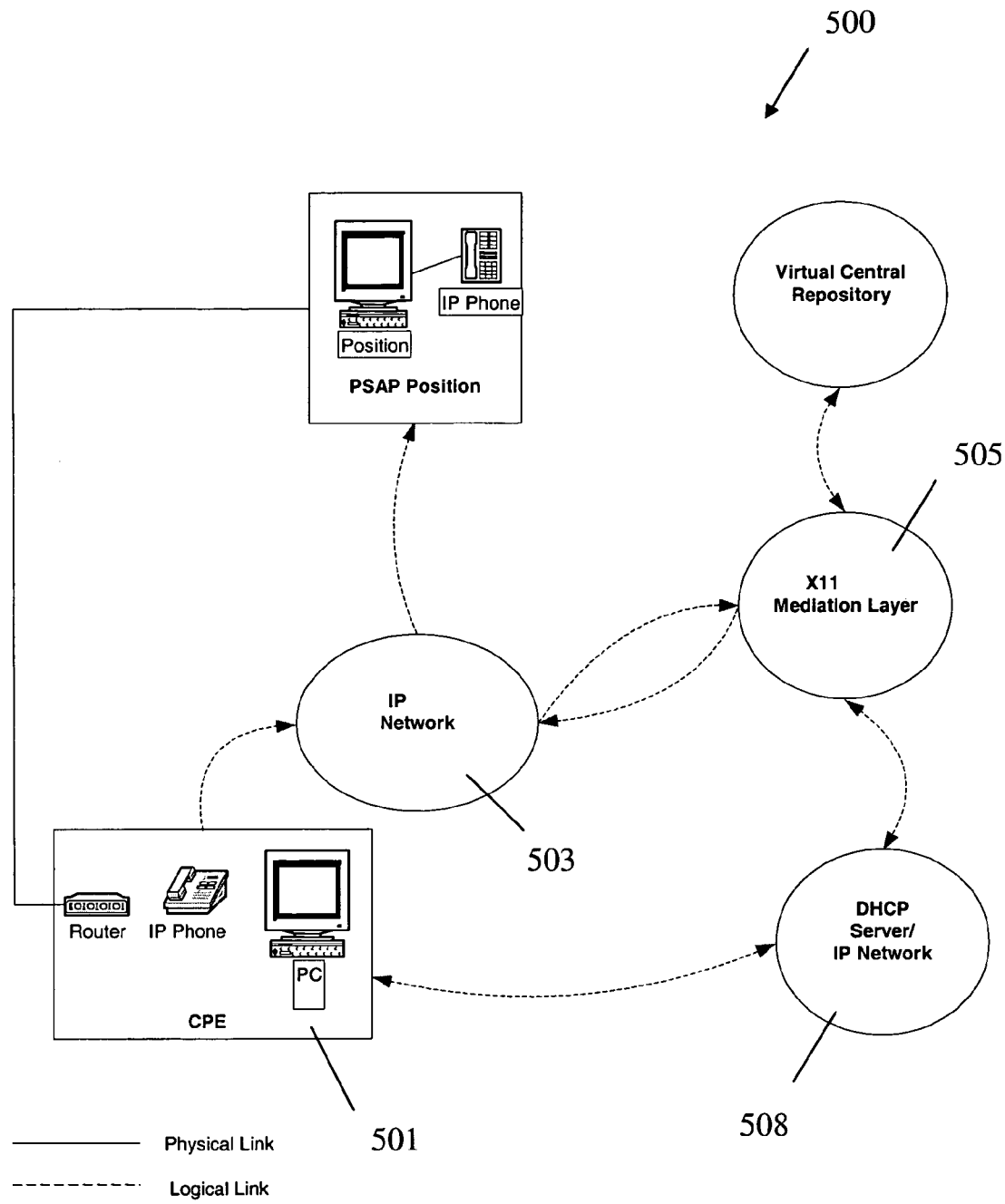
FIG. 5 illustrates a diagram for maintaining an up-to-date mediation layer.

FIG. 5 illustrates a diagram 500 through which customer identification and customer location information can be tracked automatically. Initially, customer 501 contacts a DHCP Server 508 to provide DSL (Digital Subscriber Line) services. During this process, the DHCP Server often gathers the user's physical location and the public IP address of the user's router or other pertinent CPE. The public IP address can be either DHCP or static. The DHCP Server provides the customer with an IP Address.

When the customer contacts and IP Telephone Network 503 to obtain VoIP services, the IP Telephone Company gathers the MAC address of the user router or other CPE 501. Customers using a DHCP service will have different IP address based on the DHCP server configuration. A typical DHCP Server can be configured to renew and release the IP address within a predefined timeframe, such as every 30 days. Obtaining the MAC address enables tracking, because, the MAC address is hard coded in the customer CPE. The X11 Mediation Layer 505 comprises a table for tracking the customer's physical address, the customer's CPE physical address (MAC), and the customer's IP address (DHCP or Static), among others.

Figure 6:
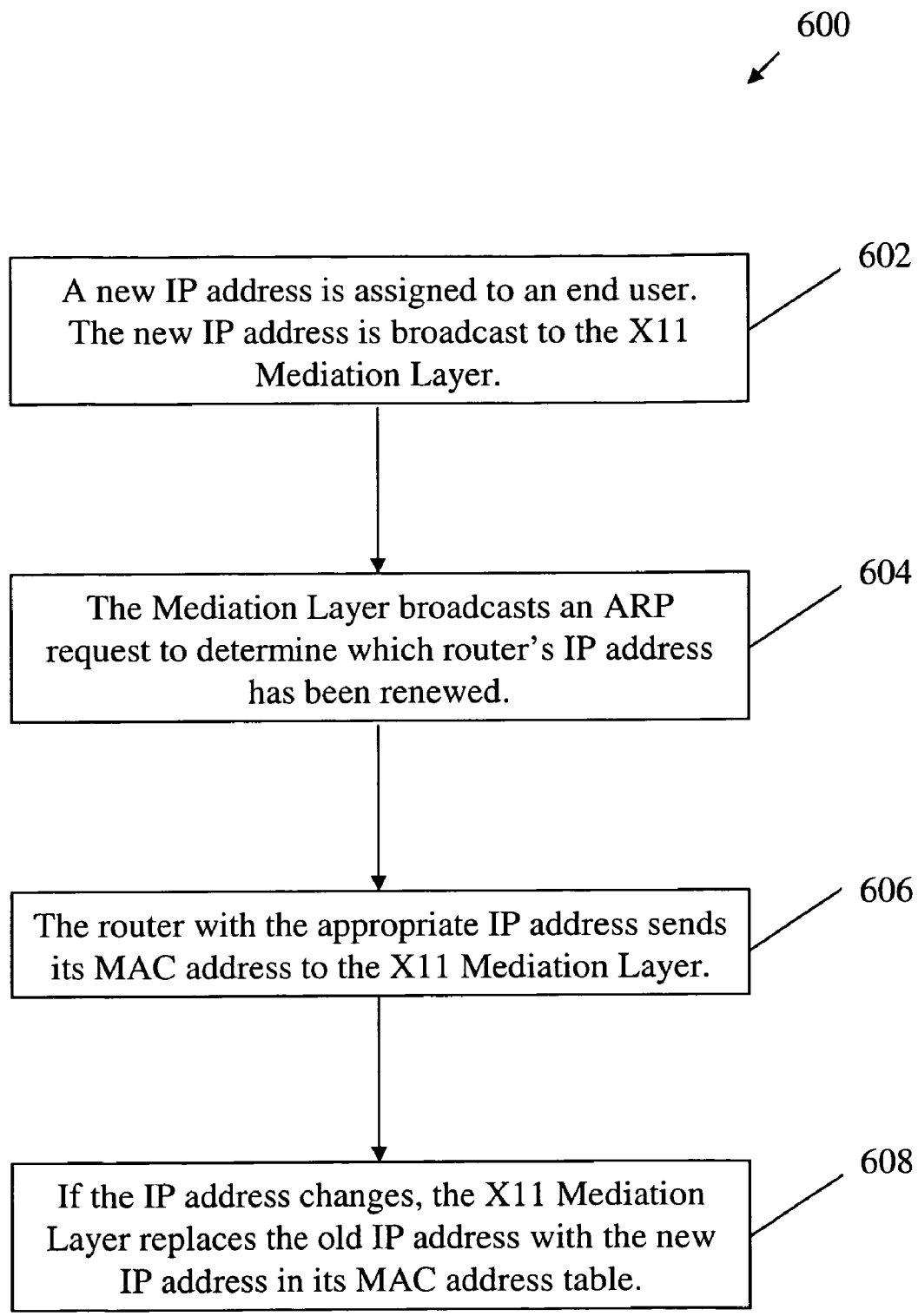
FIG. 6 illustrates a flowchart for tracking and updating IP addresses.

FIG. 6 illustrates a flowchart 600 detailing an aspect of the present invention for tracking and updating customer IP information in an IP Telephony network. Flowchart 600 can be understood in reference to the illustration of FIG. 5. In Box 602, an IP address is renewed and a new IP address (i.e., 179.69.58.80) is assigned to an end user 501. The X11 Mediation Layer 505 is informed of the new IP address by the DHCP Server 508. Once the new IP address is forwarded to the X11 Mediation Layer 505, the Mediation Layer performs an ARP (Address Resolution Protocol) Request to identify which router has received the new IP address (Box 604). In Box 606, the appropriate router 501 responds to the ARP by supplying its MAC address to the X11 Mediation Layer 505. In Box 608, if the IP address changes, the X11 Mediation Layer updates its table using the MAC address lookup. The X11 Mediation Layer checks its table for that specific MAC address and replaces the old IP address with new IP address (179.69.58.80).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed is:

1. A method of providing customer information to a call destination over an Internet Protocol (IP) communication link, comprising:
    obtaining an IP address for a device originating a call;
    maintaining at a mediation layer of the communication link a table that tracks customer information containing:
        i) a physical address of a customer,
        ii) a physical Media Access Control address of a Customer Premises Equipment, and,
        iii) an IP address of the Customer Premises Equipment;
    selecting from the table customer information related to the originating IP address; and
    routing the selected customer information to the call destination over the IP communication link.

2. The method of claim 1, wherein obtaining the originating IP address further comprises receiving the originating IP address from a particular customer premises equipment.

3. The method of claim 1, wherein the selected customer information further comprises at least one of the set consisting of name, phone number, and physical location of a caller.

4. The method of claim 1, wherein the call destination further comprises a Public Safety Answering Point (PSAP).

5. The method of claim 1, wherein maintaining the table further comprises obtaining an IP address of the Customer Premises Equipment from a Dynamic Host Configuration Protocol (DHCP) Server.

6. The method of claim 1, wherein maintaining the table further comprises obtaining customer information from a Virtual Central Repository (VCR).

7. The method of claim 1, wherein maintaining the table further comprises using an Address Resolution Protocol to determine changes in the IP address of the Customer Premises Equipment.

8. The method of claim 1, wherein the mediation layer further comprises a plurality of interconnected mediation layers used in cooperation for completing the call to the call destination.

9. An apparatus for providing customer information to a call destination using Internet Protocol (IP), comprising:
    an IP communication link configured to obtain an IP address for a device originating a call and to route customer information related to the originating IP address to the call destination; and
    a mediation layer linked to the IP communication link configured to select the customer information related to the originating IP address from a table at the mediation layer, the table containing:
        i) a physical address of the customer,
        ii) a physical Media Access Control address of a Customer Premises Equipment, and
        iii) an IP address of the Customer Premises Equipment,
    wherein the table is configured to be updated using an Address Resolution Protocol to determine changes in the IP address of the Customer Premises Equipment.

10. The apparatus of claim 9, wherein the call destination further comprises a Public Safety Answering Point (PSAP).

11. The apparatus of claim 9, wherein the IP communication link is further configured to obtain the originating IP address by receiving the originating IP address from a particular customer premises equipment.

12. The apparatus of claim 9, wherein the selected customer information further comprises at least one of the set consisting of name, phone number, and physical location of a caller.

13. The method of claim 9, wherein the mediation layer further comprises a plurality of interconnected mediation layers configured to cooperate in completing the call to the call destination.

14. The apparatus of claim 9, further comprising a Dynamic Host Configuration Protocol (DHCP) Server configured to provide IP address data of the Customer Premises Equipment to the mediation layer.

15. The apparatus of claim 9, further comprising a Virtual Central Repository (VCR) configured to provide the selected customer information to the mediation layer.

* * * * *